US009441662B2

(12) United States Patent
Susnjara

(10) Patent No.: US 9,441,662 B2
(45) Date of Patent: Sep. 13, 2016

(54) JOINT CONSTRUCTION AND METHOD OF MAKING SAME

(71) Applicant: Thermwood Corporation, Dale, IN (US)

(72) Inventor: Kenneth J. Susnjara, Birdseye, IN (US)

(73) Assignee: Thermwood Corporation, Dale, IN (US)

( * ) Notice: Subject to any disclaimer, the term of this patent is extended or adjusted under 35 U.S.C. 154(b) by 159 days.

(21) Appl. No.: 14/164,950

(22) Filed: Jan. 27, 2014

(65) Prior Publication Data
US 2015/0211567 A1 Jul. 30, 2015

(51) Int. Cl.
*B25G 3/00* (2006.01)
*F16B 2/14* (2006.01)
*F16B 35/04* (2006.01)
*E04B 1/26* (2006.01)
*F16B 25/00* (2006.01)
*B27C 3/06* (2006.01)
*F16B 5/02* (2006.01)

(52) U.S. Cl.
CPC ............... *F16B 35/04* (2013.01); *B27C 3/06* (2013.01); *E04B 1/2604* (2013.01); *F16B 25/0015* (2013.01); *F16B 5/02* (2013.01); *Y10T 29/49963* (2015.01); *Y10T 403/76* (2015.01)

(58) Field of Classification Search
CPC ............... Y10T 403/5793; Y10T 403/7021; Y10T 403/7069; Y10T 403/76; Y10T 29/49881; Y10T 29/49947; Y10T 29/49963; Y10T 29/49995; Y10T 29/49996; A47B 47/042; A47B 47/04; A47B 88/0014; B27M 3/0006; B27M 3/0073; B27F 5/00; B27F 4/00

USPC .............. 403/167, 168, 401, 409.1, DIG. 12; 312/263

See application file for complete search history.

(56) References Cited

U.S. PATENT DOCUMENTS

| | | | | | |
|---|---|---|---|---|---|
| 950,323 | A | * | 2/1910 | Gaffers | 182/220 |
| 1,097,697 | A | * | 5/1914 | Weston | 108/186 |
| 3,496,974 | A | * | 2/1970 | Munsil et al. | 144/365 |
| 3,528,691 | A | * | 9/1970 | Matich, Jr. | 403/356 |
| 3,544,185 | A | * | 12/1970 | Lundberg | 312/263 |
| 3,835,610 | A | * | 9/1974 | Harper et al. | 403/231 |
| 3,951,558 | A | * | 4/1976 | Komarov | 403/231 |
| 4,089,614 | A | * | 5/1978 | Harley | 403/231 |
| 4,603,719 | A | * | 8/1986 | Durney | 144/365 |
| 4,981,388 | A | * | 1/1991 | Becken et al. | 403/258 |

(Continued)

*Primary Examiner* — Gregory Binda
*Assistant Examiner* — Nahid Amiri
(74) *Attorney, Agent, or Firm* — Bookoff McAndrews, PLLC

(57) ABSTRACT

A method of joining a first workpiece having a first surface and a second surface angularly disposed relative to such first surface, and a second workpiece having a surface disposable in abutting relation relative to the second surface of such first workpiece, comprising forming a recess in the first surface of such first workpiece, sloped toward and spaced from the second surface of such first workpiece, producing an end surface thereof disposed at an angle relative to a longitudinal centerline of such recess; forming a notched ledge on the end surface of such recess; positioning a threaded fastener in the sloped recess with a head portion thereof resting on a bottom surface of the recess and the threaded portion thereof disposed along the centerline with the end thereof resting on such ledge; disposing the surface of the second workpiece in abutting relation with the second surface of the first workpiece; and threading the threaded fastener along the longitudinal centerline of such recess, through such abutting surfaces of such workpieces to join such workpieces together.

28 Claims, 2 Drawing Sheets

(56) References Cited

U.S. PATENT DOCUMENTS

| | | | | |
|---|---|---|---|---|
| 5,553,645 A | * | 9/1996 | Durney | 144/365 |
| 5,746,560 A | * | 5/1998 | Barth et al. | 411/188 |
| 5,769,574 A | * | 6/1998 | Feinsod | 408/1 R |
| 6,503,020 B1 | * | 1/2003 | Mascioletti et al. | 403/402 |
| 6,752,565 B2 | * | 6/2004 | Schrage | 404/25 |
| 6,877,536 B2 | * | 4/2005 | Durney | 144/365 |
| 6,955,508 B1 | * | 10/2005 | Radcliffe | 408/37 |
| 7,255,511 B2 | * | 8/2007 | Dolan | 403/403 |
| 7,815,391 B2 | * | 10/2010 | Kauppila | 403/367 |
| 8,887,468 B2 | * | 11/2014 | Hakansson et al. | 52/586.1 |

* cited by examiner

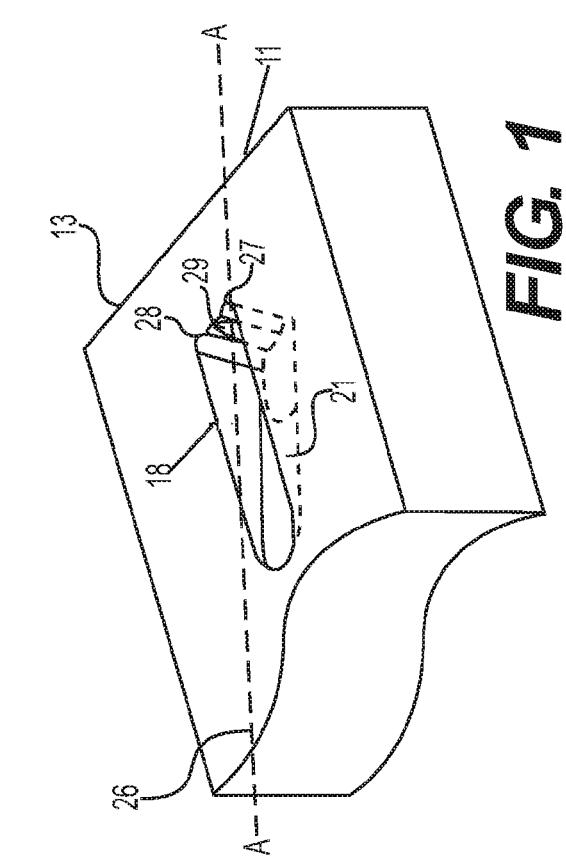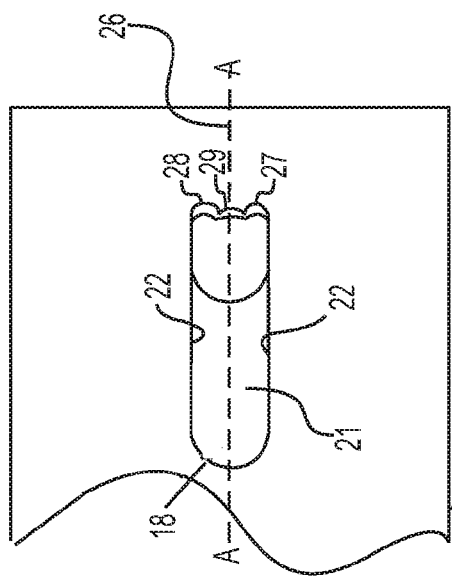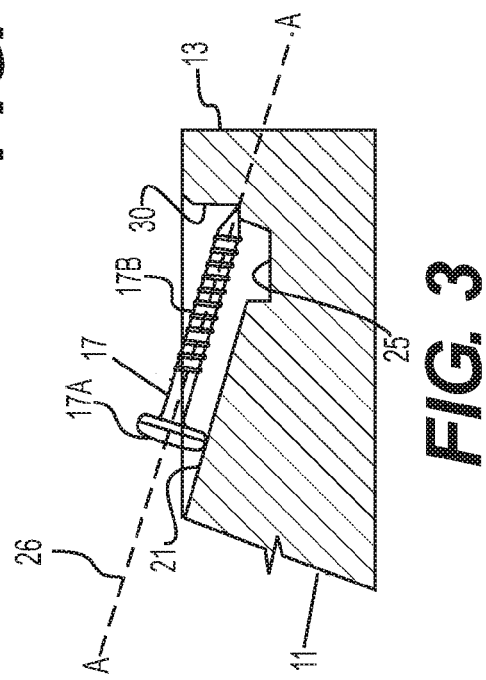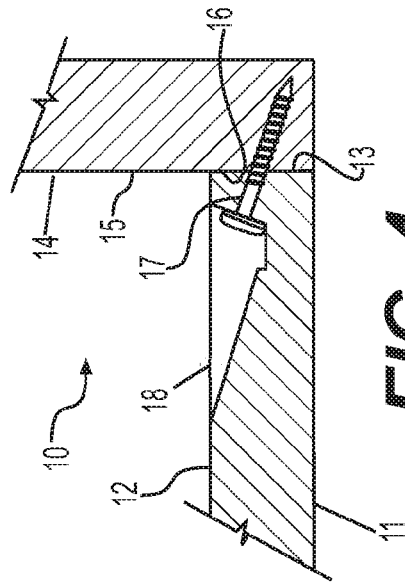

JOINT CONSTRUCTION AND METHOD OF MAKING SAME

This invention relates to an improved method for joining a pair of workpieces together, and more particularly to a method of joining such workpieces together by means of a threaded fastener. The invention further provides a novel assembly of a pair of workpieces formed by the use of such method.

BACKGROUND OF THE INVENTION

In the woodworking art, a pair of workpieces may be joined together by drilling a hole into a first workpiece at a certain angle and depth, and then fastening such first workpiece to a second workpiece by inserting a self-tapping screw through such hole and screwing it into the second workpiece. In the prior art, such method of joining a pair of workpieces together has consisted of manually clamping a drill guide on one of the workpieces, adapted to guide a drill bit at a specific angle and to a certain depth, inserting a drill through the guide device to form a stepped hole for receiving an attachment screw and then positioning and drilling the screw to join such workpieces together.

Although such prior art method has been found to be suitable in joining a pair of workpieces together with a threaded member, such method has been found to be unsuitable for mass production purposes. Accordingly, it is the principal object of the present invention to provide a more mechanized method of providing for the joinder of a pair of workpieces, dispensing with the requirement of a device clamped to one of the workpieces for guiding a tool bit in joining the workpieces together.

BRIEF DESCRIPTION OF THE INVENTION

The principal object of the present invention is achieved by providing a method of joining a first workpiece having a first surface and a second surface angularly disposed relative to such first surface, and a second workpiece having a surface disposable in abutting relation relative to the second surface of the first workpiece, comprising forming an elongated recess in the first surface of the first workpiece, sloped toward and spaced from the second surface of the first workpiece, producing an end surface thereof disposed at an angle relative to a longitudinal centerline of the recess, forming a notched ledge on the end surface of such recess, positioning a threaded fastener in the sloped recess with a head portion thereof resting on a bottom surface of such recess and the threaded shank portion thereof disposed along such longitudinal centerline with the end thereof resting on such ledge, disposing the surface of the second workpiece in abutting relation with the second surface of the first workpiece and threading the threaded fastener disposed in such recess along the longitudinal centerline of the recess through the abutting surfaces of such workpieces to join such abutting workpieces together. In the preferred embodiment of the invention, such recess is formed with a machine tool provided with a cutting tool which may be indexed simultaneously along a z-axis disposed orthogonally relative to the first surface of the first workpiece and an x-axis disposed parallel to the first surface of the first workpiece to form the sloped recess, and such ledge is formed with a cutting tool of the machine advanced along the x-axis, In inserting the threaded fastener to join the two members together, the threaded member first is inserted in the recess with the head portion thereof resting on the bottom portion of the recess and the tip portion of the threaded shank resting on the ledge of the recess, and then the member is driven with a screwdriver to cause the penetration of the threaded shank portion along the longitudinal centerline of the recess to penetrate the abutting members being joined together, and the engagement of the head portion of the threaded fastener with the end wall of the recess. The invention further contemplates an assembly formed by the practice of the aforementioned method.

BRIEF DESCRIPTION OF THE DRAWINGS

FIG. 1 is a perspective view of a workpiece to be joined together with another workpiece, provided with a recess adapted to accommodate a threaded fastener intended to be threaded and thus penetrate the illustrated workpiece and an abutting workpiece in joining such workpieces together;

FIG. 2 is a partial top view of the workpiece shown in FIG. 1;

FIG. 3 is an enlarged, vertical cross sectional view taken through the recess shown in FIG. 2, illustrating the positioning of a threaded fastener in such recess, postured to be driven through the end of the illustrated workpiece and an abutting workpiece to join such workpieces together;

FIG. 4 is a vertical cross sectional view taken through the recess of a first workpiece as shown in FIG. 3, with a threaded fastener having been postured as shown in FIG. 3, penetrating an abutting second workpiece, joining such workpieces.

DETAILED DESCRIPTION OF THE PREFERRED EMBODIMENTS OF THE INVENTION

Figure 5B:
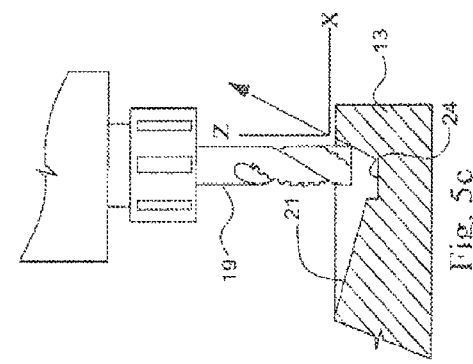
FIGS. 5a through 5f illustrate a sequence of machining functions utilizing drills of different sizes for forming a recess in a first workpiece as shown in FIGS. 1 through 4.

Referring to the drawings, there is illustrated an assembly 10 embodying an aspect of the present invention, and a number of stages in the fabrication of such assembly in the practice of a method embodying another aspect of the invention. As shown in FIG. 4, assembly 10 includes a first workpiece 11 provided with a planar surface 12 and an end surface 13 disposed at an angle relative to planar surface 12, a second workpiece 14 provided with a planar surface 15 including an end portion 16, and a threaded fastener 17 joining such workpieces together. Such fastener comprises a conventional screw having a head portion 17a provided with a rounded side edge and a flat end surface provided with a single diametrically disposed groove accommodating a conventional screwdriver or a pair of diametrically disposed, intersecting grooves accommodating a Phillips head screwdriver, and a threaded shank portion 17b.

In fabricating assembly 10, an elongated recess 18 is formed in planar surface 12 of workpiece 11, extending toward but spaced from end surface 13. Such recess is formed by mounting and securing a first workpiece on the bed of a conventional CNC router machine provided with multiple tools including a first router bit 19 having a diameter corresponding to the diameter of the head portion of the fastener to be inserted and driven in the recess to be produced, and a second router bit 20 having a diameter smaller than the diameter of router bit 19.

The CNC router used to form recess 18 is of a conventional construction including a bed, a workpiece table mounted on such bed fixedly or displaceable along a longitudinal or x-axis, a gantry supported on the bed fixedly or displacable along such longitudinal or x-axis, a tool carrier assembly mounted on such gantry and displaceable transversely or along a y-axis and tooling providing router bits 19 and 20 mounted on the tool carrier assembly and displaceable vertically or along the z-axis.

Figure 5E:
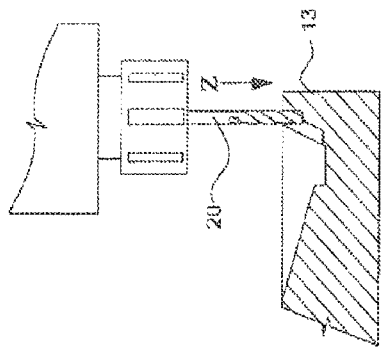
Figure 5A:
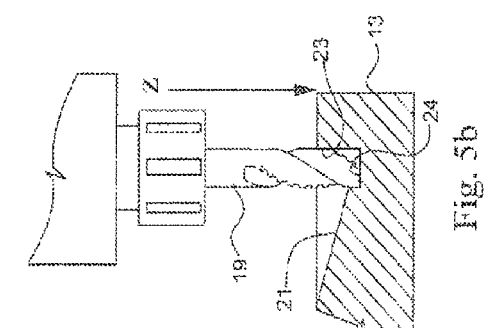
Figure 5C:
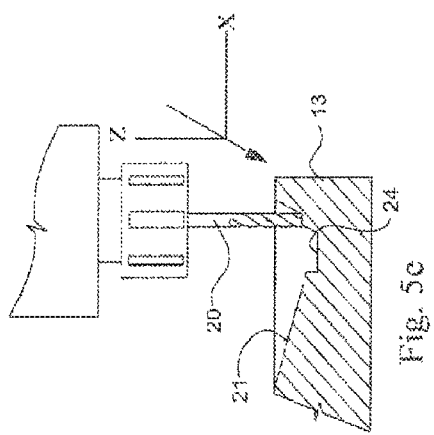

With the router suitably programmed and a workpiece 11 suitably mounted on the worktable thereof, the installed program is run initially to cause router bit 19 to be advanced simultaneously along the x and z axes, in the direction of the illustrated arrow, as shown in FIG. 5*a*, to form an elongated recess with a sloped bottom surface 21, a pair of spaced sidewalls 22,22 and an interumend wall 23 spaced from but adjacent end surface 13. Upon reaching a predetermined point in advancing the router bit along the x and z axes, router bit 19 is extended along the z-axis to form a shallow recess at the end of the recess provided with a bottom surface 24 as shown in FIG. 5*b*. With the router bit in the position as shown in FIG. 5*b*, the machine operates to advance the router bit simultaneously along the x and z axes, in the direction of the arrow, to form and end wall 25 disposed substantially perpendicular to the plane of bottom wall 21 of the recess, as shown in FIGS. 5*c* and 5*d*.

Figure 5D:
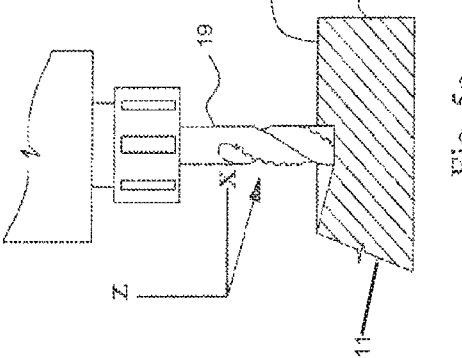
Figure 5F:
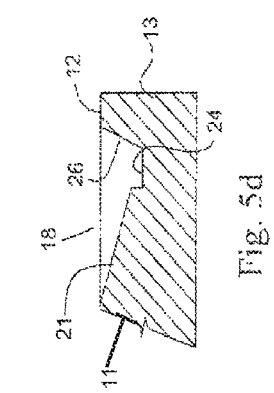

Upon formation of the recess shown in FIG. 5*d*, an automatic tool change occurs, providing for a smaller router bit 20 which sequentially is displaced simultaneously along the z and x axes, in the direction of the arrow shown, as shown in FIG. 5*e*, laterally of a longitudinal centerline 26 of recess 18, to form a pair of laterally spaced recesses 27 and 28 in end wall 26, as best shown in FIGS. 1 and 2. Router bit 20 then is repositioned and displaced along the z-axis as shown in FIG. 5*f*, in the direction of the arrow, to form a shallow recess 29 in end wall 26 between recesses 27 and 28 providing a ledge intersecting centerline 26, as shown in FIG. 3.

With recess 23 in surface 12 of workpiece 11 thus formed, workpieces 11 and 14 may be joined together to form an assembly as shown in FIG. 4 by orienting workpiece 14 in an upright position, buttressed against an object at rest positioning workpiece 11 with end surface 13 thereof abutting the lower end of surface 16 of workpiece 14, positioning a threaded fastener 17 in recess 18 along centerline 26 with a head portion thereof resting on sloped bottom wall 21 between sidewalk 22,22 and a pointed end of threaded shank portion 17*b* thereof resting on the ledge of shallow recess 29, and then applying a driver to fastener 17 to drive it through abutting portions of the workpieces and thus join such workpieces together. In doing so, the inner, annular surface of the head portion of the fastener, is caused to engage and distort the thin sections of end wall 26 disposed between shallow recesses 27, 28 and 29, causing the force applied by the head portion of the fastener to be absorbed or dissipated by the deformation of such wall sections in lieu of being transmitted through the end portion of workpiece 11 to cause separations in the form of cracks, particularly in the use of wooden materials.

The method and assembly as described provides for a rapid and effective joinder of pairs of workpieces utilizing threaded fasteners without the requirement of clamping workpieces together or providing guide devices for attaching threaded fasteners. The prescribed recess accommodating a fastener may be rapidly and accurately formed, the threaded fastener may be suitably postured in such machined recess and such fastener may be readily guided in being driven to join such workpieces together. By reason of the configuration of the end wall of such recess, forces applied by the head portion of the fastener to the end wall of the recess are absorbed or dissipated, avoiding the formation of cracks in the wood pieces in driving the fasteners. Preferably, the slope of the bottom wall of the recess is in the order of 15° relative to a planar surface of a workpiece, and a router bit with a rounded end having a radius similar to the radius of the head portion of the threaded fastener can be provided to form a curved bottom wall of the recess in more effectively accommodating the positioning and guidance of the fastener. In the production of quantities of products utilizing the type of joint described, a plurality of first workpieces can be mounted on the worktable of a suitably programmed CNC router to produce a multitude of workpieces provided with various numbers and placements of recesses required in the joinder of workpieces to produce a variety of products.

From the foregoing detailed description, it will be evident that there are a number of changes, adaptations and modifications of the present invention, which come within the province of those persons having ordinary skill in the art to which the aforementioned invention pertains. However, it is intended that all such variations not departing from the spirit of the invention be considered as within the scope thereof as limited solely by the appended claims.

I claim:

1. A method of joining a first workpiece having a first surface and a second surface angularly disposed relative to said first surface, and a second workpiece having a surface disposable in abutting relation relative to said second surface of said first workpiece, comprising:
   forming an elongated recess in said first surface of said first workpiece, sloped toward and spaced from said second surface of said first workpiece, producing an end surface thereof disposed at an angle relative to a longitudinal centerline of said recess;
   forming a notched ledge on said end surface of said recess, wherein said notched ledge is along said longitudinal centerline of said recess;
   positioning a threaded fastener in said elongated recess with a head portion thereof resting on a bottom surface of said recess and the threaded portion thereof disposed along said longitudinal centerline with the end thereof resting on said ledge;
   disposing said surface of said second workpiece in abutting relation with said second surface of said first workpiece; and
   threading said threaded fastener along said longitudinal centerline of said recess, through said abutting surfaces of said workpieces to join said abutting workpieces together,
   wherein said ledge provides a support surface for an end of the shank portion of a fastener disposed in said recess along said centerline.

2. The method of claim 1 wherein said surfaces of said workpieces are planar.

3. The method of claim 1 wherein said surface of said second workpiece is disposed at a right angle relative to said first surface of said first workpiece.

4. The method of claim 1 including forming said elongated recess with a width substantially the same as the diameter of the head portion of said threaded fastener.

5. The method of claim 1 including forming said elongated recess with an arcuate bottom surface having a radius relative to said longitudinal centerline substantially the same as the radius of the head portion of said threaded fastener.

6. The method of claim 1 including forming recesses in said end surface, each laterally offset from said notched ledge.

7. A method of joining a first workpiece having a first surface and a second surface angularly disposed relative to said first surface, and a second workpiece having a surface disposable in abutting relation relative to said second surface of said first workpiece, comprising:

forming an elongated recess in said first surface of said first workpiece, sloped toward and spaced from said second surface of said first workpiece, producing an end surface thereof disposed at an angle relative to a longitudinal centerline of said recess;

forming a notched ledge on said end surface of said recess;

positioning a threaded fastener in said elongated recess with a head portion thereof resting on a bottom surface of said recess and the threaded portion thereof disposed along said longitudinal centerline with the end thereof resting on said ledge;

disposing said surface of said second workpiece in abutting relation with said second surface of said first workpiece; and threading said threaded fastener along said longitudinal centerline of said recess, through said abutting surfaces of said workpieces to join said abutting workpieces together, wherein said ledge provides a support surface for an end of the shank portion of a fastener disposed in said recess along said centerline, wherein the method further includes forming said elongated recess with a machine tool provided with a first cutting tool indexed simultaneously along a Z-axis disposed orthogonally relative to said first surface of said workpiece and an x-axis disposed parallel to said first surface of said first workpiece to form said elongated recess, and forming said ledge with a second cutting tool of said machine tool advanced along said z-axis.

8. The method of claim 7 including advancing said first cutting tool out of said elongated recess at the end of the formation thereof, simultaneously along said z and x-axes to form an end surface disposed substantially orthogonally relative to said longitudinal centerline.

9. The method of claim 8 including forming said ledge on said orthogonally disposed surface.

10. The method of claim 7 including advancing said first cutting tool indexed along said longitudinal centerline, along said x-axis at the end of the travel of said first cutting tool along said longitudinal centerline to provide an end of said elongated recess of greater depth.

11. The method of claim 10 including forming said elongated recess with a width substantially similar to the diameter of the head portion of said threaded fastener.

12. The method of claim 10 including forming said elongated recess with an arcuate bottom surface having a radius, relative to said longitudinal centerline substantially the same as the radius of said head portion of said threaded fastener.

13. The method of claim 10 including advancing said first cutting tool out of said greater depth at the end of said elongated recess, simultaneously along said x and z axes to form an end surface disposed substantially orthogonally to said longitudinal centerline.

14. The method of claim 13 including forming said ledge on said end surface.

15. A method of forming an assembly including a first workpiece having a first surface and a second surface disposed angularly relative to said first surface, and a second workpiece having a mating surface disposed in abutting relation relative to said second surface of said first workpiece, the method comprising:

forming an elongated recess in said first surface of said first workpiece, sloped toward and spaced from said second surface of said first workpiece, producing an end surface thereof disposed at an angle relative to a longitudinal centerline of said recess, wherein said elongated recess is formed with a machine tool provided with a first cutting tool indexed simultaneously along a Z-axis disposed orthogonally relative to said first surface of said first workpiece and an X-axis disposed parallel to said first surface of said first workpiece to form said elongated recess;

forming a notched ledge on said end surface of said recess, wherein said ledge is formed with a second cutting tool of said machine tool advanced along said Z-axis, wherein the second cutting tool is different from the first cutting tool;

positioning a threaded fastener in said elongated recess with a head portion thereof resting on a bottom end of said elongated recess and the threaded portion thereof disposed along said longitudinal centerline with the end thereof resting on said ledge;

disposing said mating surface of said second workpiece in abutting relation with said second surface of said first workpiece; and threading said threaded fastener along said longitudinal centerline of said elongated recess, through said second surface of said first workpiece and said mating surface of said second workpiece, to secure said abutting workpieces together.

16. The method of claim 15 wherein said surfaces of said workpieces are planar.

17. The method of claim 16 wherein recesses are formed in said first surface, each laterally of said notched ledged.

18. The method of claim 15 wherein said surface of said second workpiece is disposed at a right angle relative to said surface of said first workpiece.

19. The method of claim 15 wherein said elongated recess is formed with a width substantially the same as the diameter of the head portion of said threaded fastener.

20. The method of claim 15 wherein said elongated recess is formed with an arcuate bottom surface having a radius relative to said longitudinal centerline, substantially the same as the radius of the head portion of said threaded fastener.

21. The method of claim 15 wherein said first cutting tool is advanced out of said elongated recess at the end of the formation thereof, simultaneously along said z and x-axes to form an end surface disposed substantially orthogonally relative to said longitudinal centerline.

22. The method of claim 21 wherein a ledge is formed on said end surface.

23. The method of claim 15 wherein said first cutting tool indexed along said longitudinal centerline is advanced along said x-axis at the end of travel thereof along said longitudinal centerline to provide an end of said elongated recess of greater depth.

24. The method of claim 23 wherein said elongated recess is formed with a width substantially similar to the diameter of the head portion of said threaded fastener.

25. The method of claim 23 wherein said elongated recess is formed with an arcuate bottom surface having a radius relative to said longitudinal centerline substantially the same as the radius of said head portion of said threaded fastener.

26. The method of claim 23 wherein said first cutting tool is advanced out of said greater depth of said elongated recess, simultaneously along said x and z-axes to form an end surface disposed substantially orthogonally relative to said longitudinal centerline.

27. The method of claim 26 wherein said ledge is formed on said end surface.

28. A joint construction comprising:
- a first workpiece provided with a first surface, a second surface disposed at an angle relative to said first surface, a sloped recess disposed in said first surface having a longitudinal centerline extending through said second surface and a ledge formed on an end wall of said sloped recess, wherein said longitudinal centerline intersects said sloped recess;
- a second workpiece provided with a surface abutting said second surface of said first workpiece; and
- a threaded fastener inserted through said sloped recess along said longitudinal centerline, having a threaded portion thereof with an end thereof resting on said ledge, threaded through the abutting surfaces of said workpieces, with a head portion engaging the end surface of said recess.

\* \* \* \* \*